US011067223B1

(12) United States Patent
Lehr

(10) Patent No.: US 11,067,223 B1
(45) Date of Patent: Jul. 20, 2021

(54) CLUTCH FOR GIMBAL SYSTEM

(71) Applicant: Matthew D. Lehr, King George, VA (US)

(72) Inventor: Matthew D. Lehr, King George, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 15 days.

(21) Appl. No.: 16/668,275

(22) Filed: Oct. 30, 2019

Related U.S. Application Data

(60) Provisional application No. 62/913,869, filed on Oct. 11, 2019.

(51) Int. Cl.
| | |
|---|---|
| *F16M 11/00* | (2006.01) |
| *F16M 13/02* | (2006.01) |
| *F16D 27/14* | (2006.01) |
| *F16H 1/16* | (2006.01) |
| *F16M 11/10* | (2006.01) |
| *F16M 11/18* | (2006.01) |
| *F16D 27/00* | (2006.01) |

(52) U.S. Cl.
CPC ........... *F16M 13/022* (2013.01); *F16D 27/14* (2013.01); *F16H 1/16* (2013.01); *F16M 11/10* (2013.01); *F16M 11/18* (2013.01); *F16D 2027/005* (2013.01); *F16D 2200/003* (2013.01); *F16D 2200/0004* (2013.01); *F16M 2200/022* (2013.01)

(58) Field of Classification Search
CPC ...... F16M 13/022; F16M 11/00; F16D 28/00; F16D 29/00
See application file for complete search history.

(56) References Cited

U.S. PATENT DOCUMENTS

| | | | | |
|---|---|---|---|---|
| 5,172,023 | A * | 12/1992 | Kawai ................... | H02N 2/163 310/323.04 |
| 7,573,624 | B2 * | 8/2009 | Thibout ................. | H02N 2/108 310/323.06 |
| 2005/0147704 | A1 * | 7/2005 | Ickinger .............. | B29C 45/5008 425/145 |
| 2013/0340855 | A1 * | 12/2013 | Simpson ............ | B65H 75/4486 137/355.21 |

\* cited by examiner

*Primary Examiner* — Amy J. Sterling
(74) *Attorney, Agent, or Firm* — Gerhard W. Thielman

(57) ABSTRACT

A trunnion clutch system is provided for angularly positioning a payload. The system includes a trunnion and a clutch. The trunnion has an annular trunnion housing, a trunnion shaft that engages the payload, and an electromagnetic motor that turns the trunnion housing. The clutch has an annular clutch housing, a jack shaft, a coil of copper winding rings, a plurality of helical springs, an annular armature, and an annular platform. The clutch housing contains a channel. The jack shaft is disposed in the clutch housing and engages the trunnion. The coil of copper winding rings is disposed within the channel. The helical springs are disposed within an angularly distributed plurality of pockets within the clutch housing. The annular armature is disposed to be separate from the coil by a gap via the springs. The annular platform has an abrasive liner disposed adjacent the armature. Energizing the coil pulls the armature away from the liner, thereby disengaging the trunnion.

4 Claims, 6 Drawing Sheets

CLUTCH FOR GIMBAL SYSTEM

CROSS REFERENCE TO RELATED APPLICATION

Pursuant to 35 U.S.C. § 119, the benefit of priority from provisional application 62/913,869, with a filing date of Oct. 11, 2019, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to trunnions. In particular, the invention relates to a trunnion clutch system that gimbals a payload and enables the trunnion to disengage from the payload.

Navy combat vessels employ mechanical gimbal platforms to aim at moving targets. Typically, these platforms include servos to drive motors for altering the azimuth and elevation of the payload.

SUMMARY

Conventional trunnions yield disadvantages addressed by various exemplary embodiments of the present invention. In particular, exemplary embodiments provide a trunnion clutch system for angularly positioning a payload. The system includes a trunnion and a clutch.

The trunnion has an annular trunnion housing, a trunnion shaft that engages the payload, and an electromagnetic motor that turns the trunnion housing. The clutch has an annular clutch housing, a jack shaft, a coil of copper winding rings, a plurality of helical springs, an annular armature, and an annular platform. The clutch housing contains a channel.

The jack shaft is disposed in the clutch housing and engages the trunnion. The coil of copper winding rings is disposed within the channel. The helical springs are disposed within an angularly distributed plurality of pockets within the clutch housing. The annular armature is disposed to be separate from the coil by a gap via the springs. The annular platform has an abrasive liner disposed adjacent the armature. Energizing the coil pulls the armature away from the liner, thereby disengaging the trunnion.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Exemplary embodiments present an improvement in the design of trunnions for gimbals and similar machines. Specifically, exemplary embodiments provide a method of and device for braking a payload, and provides an input for the purpose of manually driving (i.e., rotating) the payload. In the context of exemplary embodiments, gimbals are machines used to aim a payload at a target, and track the target through changes in its relative position.

Figure 1:
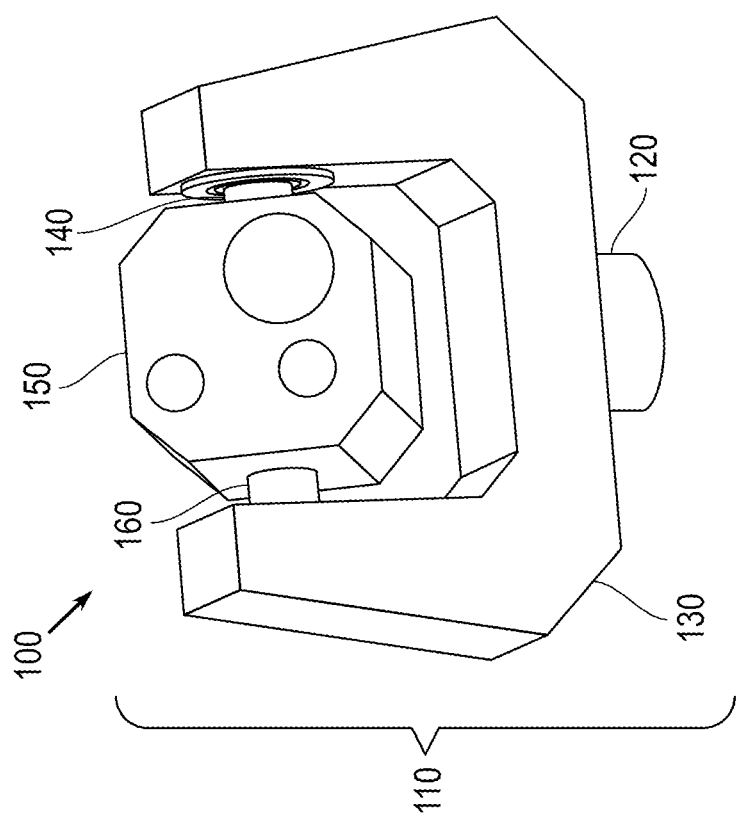
FIG. 1 is an isometric view of an example gimbal layout.

FIG. 1 shows an isometric view 100 of a weapons tracking assembly 110. An azimuth support 120 holds and pivots a gimbal yoke 130. A pair of trunnion assemblies 140 mounted to opposing forks of the yoke 130 support a payload 150 that features commonly an optical tracking system, radar platform or a weapon. A yoke shaft 160 connects the payload 150 to the trunnions 140.

The trunnion assemblies 140 serve a number of roles in the gimbal components of the assembly 110. Firstly, they support the weight of the payload 150, enabling it to pivot upward and downward. In modern systems, these may also incorporate a direct-drive motor, in which case such a device is termed a "drive trunnion" for such purposes. Alternatively, such an assembly is "driven" without such a motor. Exemplary embodiments are applicable to either type, but a drive trunnion is depicted herein. Mass of an exemplary ship-board payload 150 can be about 500 kg and have outer diameters of about 150 cm, although other dimensions can be envisioned without departing from the invention's scope.

Figure 2:
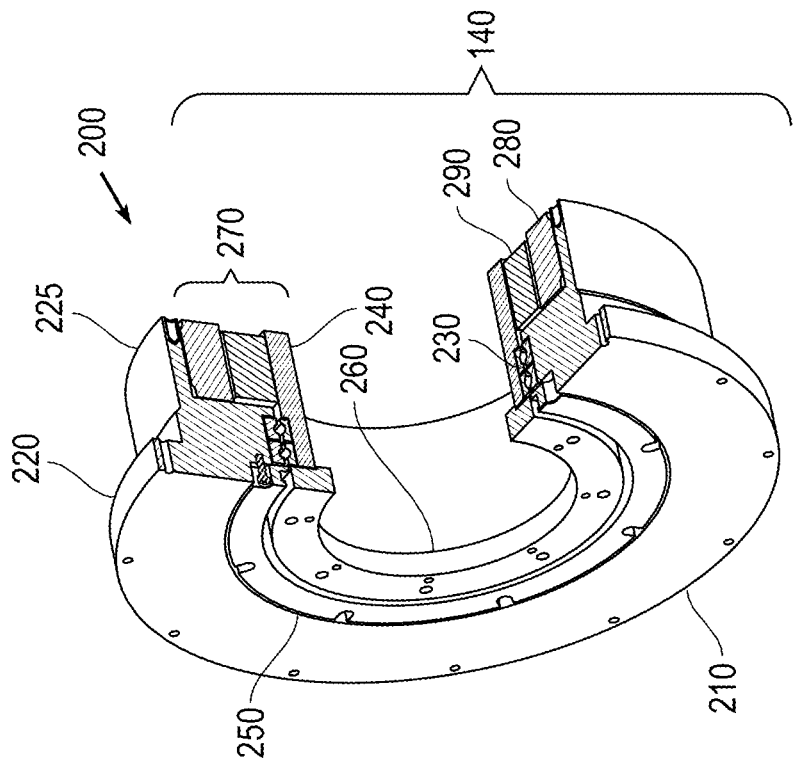
FIG. 2 is an isometric cross-sectional view of a typical trunnion.

FIG. 2 shows an isometric three-quarter cross-sectional view 200 of a generic drive trunnion assembly 140 with a proximal housing 210 forming the main body. The view 200 illustrates the housing 210 from the obverse side proximal to and facing the payload 150. The housing 210 contains an annular outer flange 220 with a bolt circle near the rim for attaching to the yoke 130, as well as an annular interior extension 225, which carries a bearing set 230 in which an annular trunnion sleeve 240 turns on its cylindrical axis.

The trunnion sleeve 240 may have a large through-bore as shown, to serve as a passage for cables, hoses and/or signal connections that attach to the payload 150. The bearing set 230 is secured with outer and inner clamp rings 250 and 260, respectively for connecting to the yoke shaft 160. A drive motor 270 comprises a stator 280 and rotor 290 to provide motive power to the trunnion sleeve 240.

In the case of a driven trunnion, the drive motor 270 would be absent and the extension 225 correspondingly shorter. It should be noted that there are other trunnion arrangements, and that common components not relevant to exemplary embodiments are omitted for the sake of clarity. In normal, powered operation, the trunnion sleeve 240 is rotated by the motor 270.

However, many military applications also require that the trunnion sleeve 240 be rotated manually, either for maintenance or to rotate the payload 150 in the event of a loss of power. This manual rotation functionality is commonly referred to as a manual drive system. Ideally, this would be accomplished automatically, and in such a manner to avoid interference with the through-bore, and also to not subject the trunnion sleeve 240 to any additional drag when not in operation.

A second ancillary function often required for a trunnion assembly 140 is to prevent rotation of the payload 150 when the motors 270 are turned off, and to bring the payload 150 to a stop in the event of power loss occurs during normal gimbal operation. This functionality is commonly referred to as trunnion braking. Exemplary embodiments solve the braking and manual drive problems.

Figure 3:
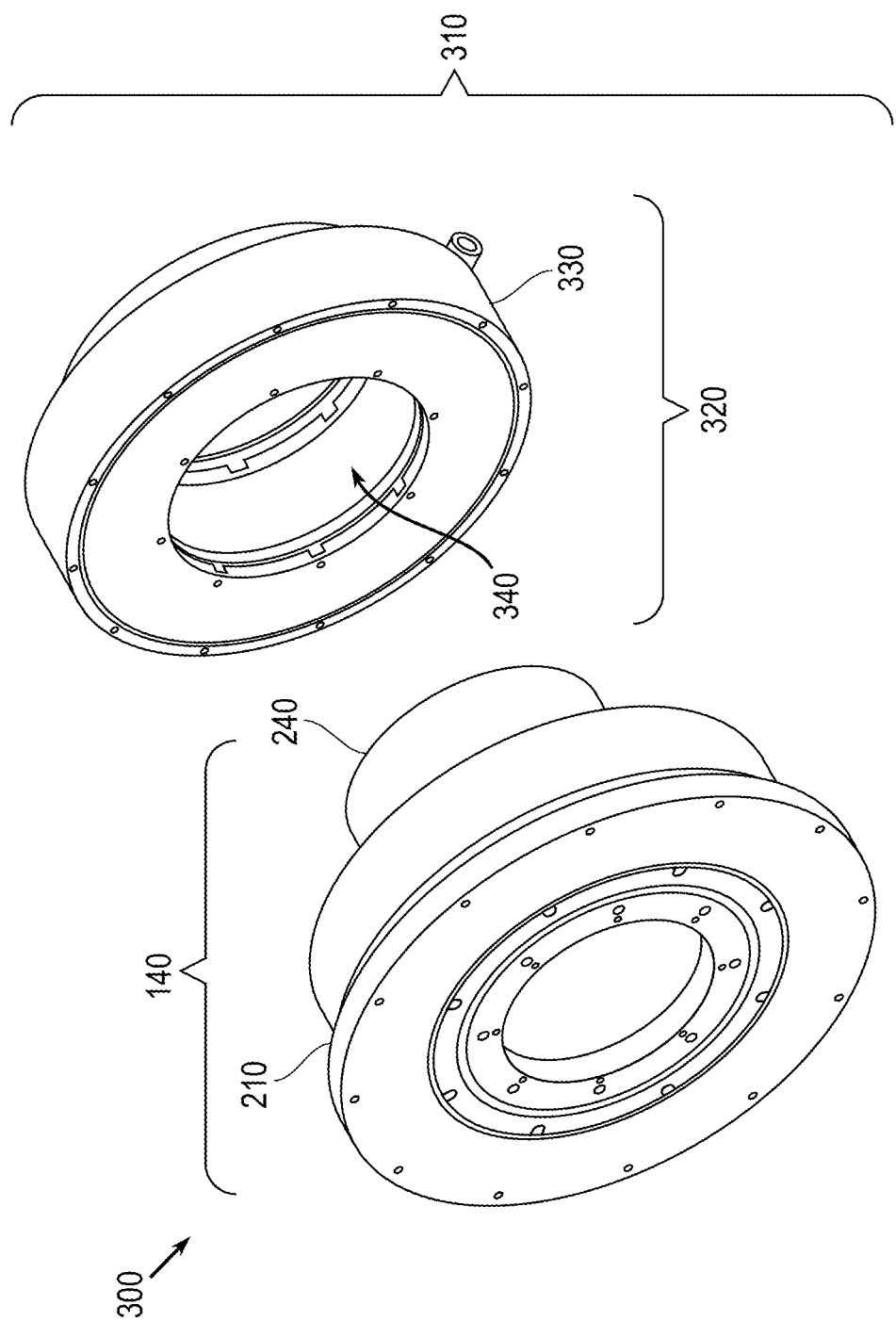
FIG. 3 is an isometric exploded view of a trunnion and manual drive assembly.

FIG. 3 shows an isometric exploded view 300 of a gimbal assembly 310, including a clutch assembly 320 and the trunnion assembly 140. The view 300 illustrates the trunnion assembly 140 and the gimbal assembly 310 from the obverse side, similar to view 200. The clutch assembly 320 includes a distal housing 330 with an annulus 340. The trunnion sleeve 240 inserts into the annulus 340 upon assembly. The housings 210 and 330 can be composed of appropriate metals, such as aluminum or steel.

Figure 4:
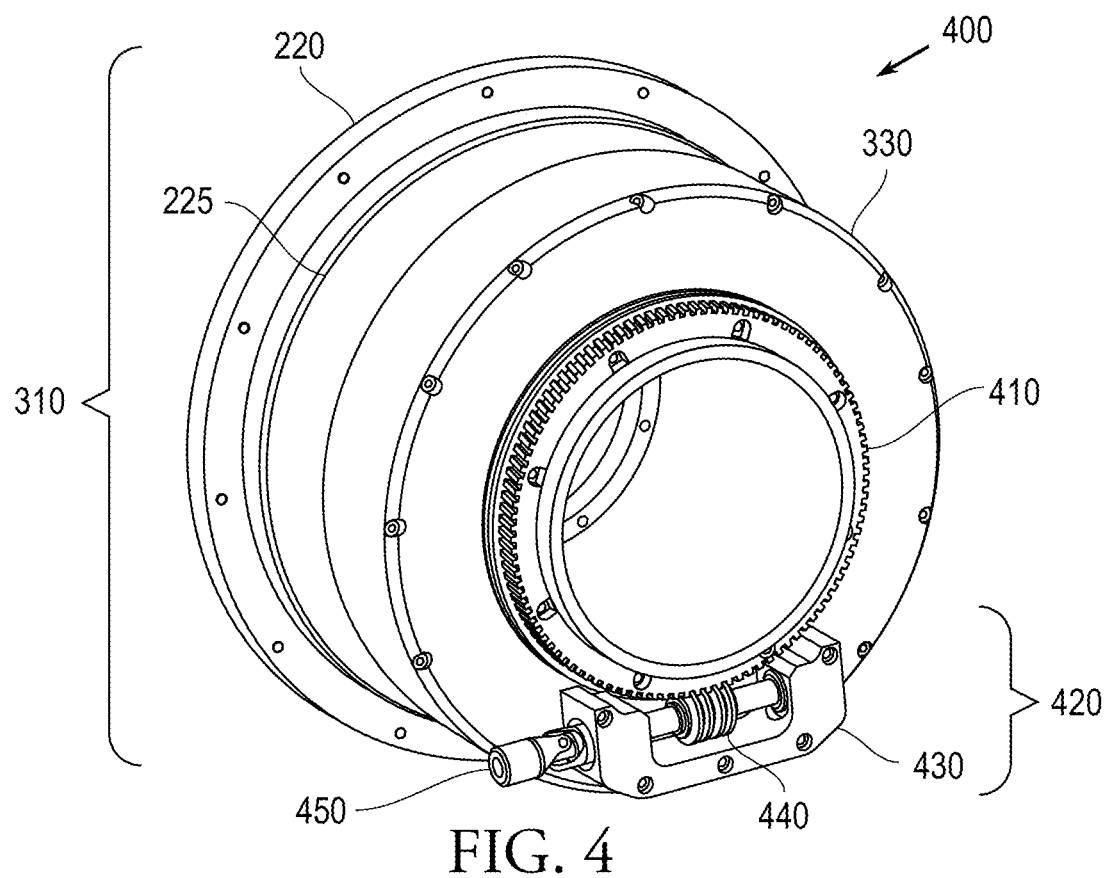
FIG. 4 is an isometric view of a gear arrangement.

FIG. 4 shows a detail isometric view 400 of the trunnion assembly 310 in which the housing 330 is equipped with a wormgear 410 with rim teeth (see FIG. 7) that can be turned by a worm arrangement 420. The view 400 illustrates the clutch assembly 320 from the reverse face and distal to the payload 150, opposite to view 300. A worm housing 430 supports a worm 440 on a turn shaft tangent to the wormgear 410. A manual drive input 450 connects coaxially to the worm 440. The worm 440 engages the rim teeth on the wormgear 410.

In order to the device to function as intended, the gear arrangement 420 should be designed so as to be non-overrunning. That is, the worm 440 shall be able to rotate the wormgear 410, but not vice versa—i.e., the wormgear 410 is prohibited from back-driving the worm 440. This is naturally achieved if the gear ratio chosen exceeds approximately 30:1. The input 450 is provided with an appurtenance for the application of manual power to the worm 440. In this case, the input 450 constitutes a universal joint. The operator may use a wrench, hand-wheel, crank, or other means to drive the input 450, and hence the payload 150, while the trunnion assembly 140 is in the unpowered state.

Figure 5:
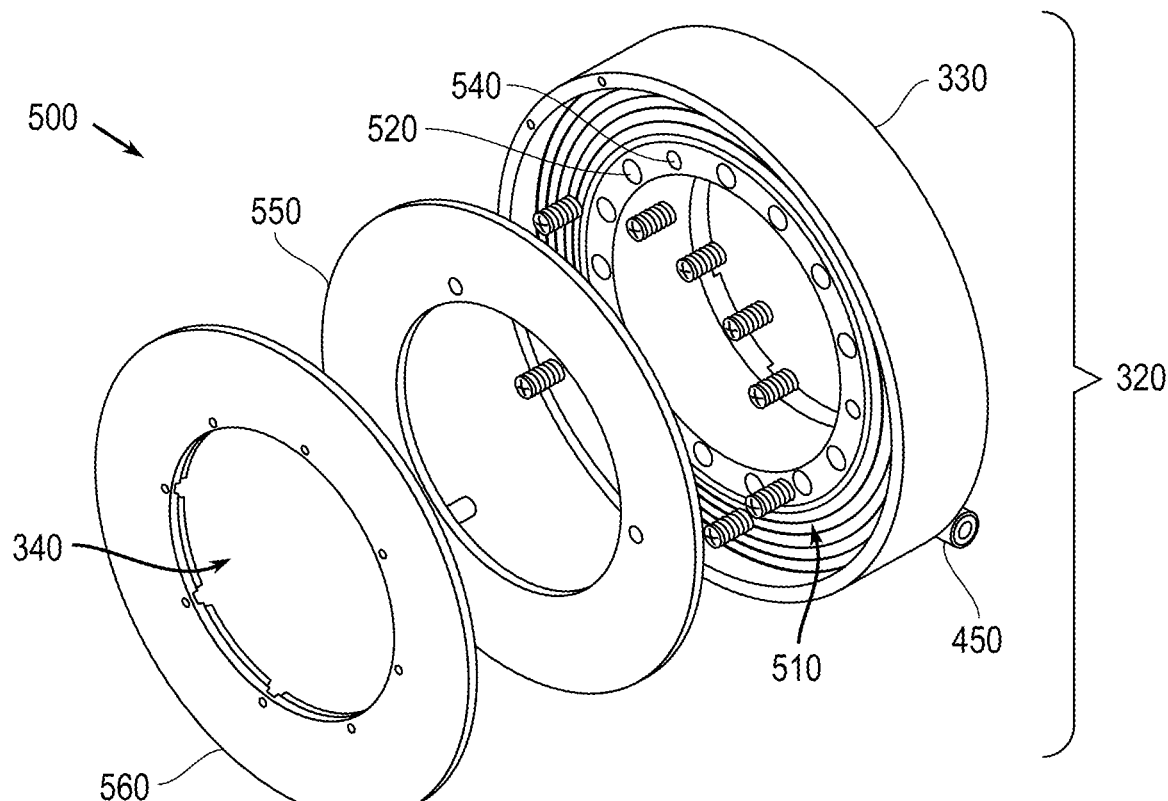
FIG. 5 is an isometric exploded view of a clutch assembly.

FIG. 5 shows an isometric exploded view 500 of the clutch assembly 320. View 500 illustrates these components from the obverse face—proximal to payload 150 and similar to view 300, including an inner surface 510. Cylindrical pockets 520 are angularly spaced about and radially outward from the annulus 340. Helical springs 530 can be inserted into the pockets 520. Alignment recesses 540 are also adjacent the pockets 520. An annular armature plate 550 can be inserted to abut the surface 510, overlaid by an annular liner carrier 560. Alignment pins 570 on the armature plate 550 can insert into the alignment recesses 540 to guide the armature plate 550 into the housing 330.

Figure 6:
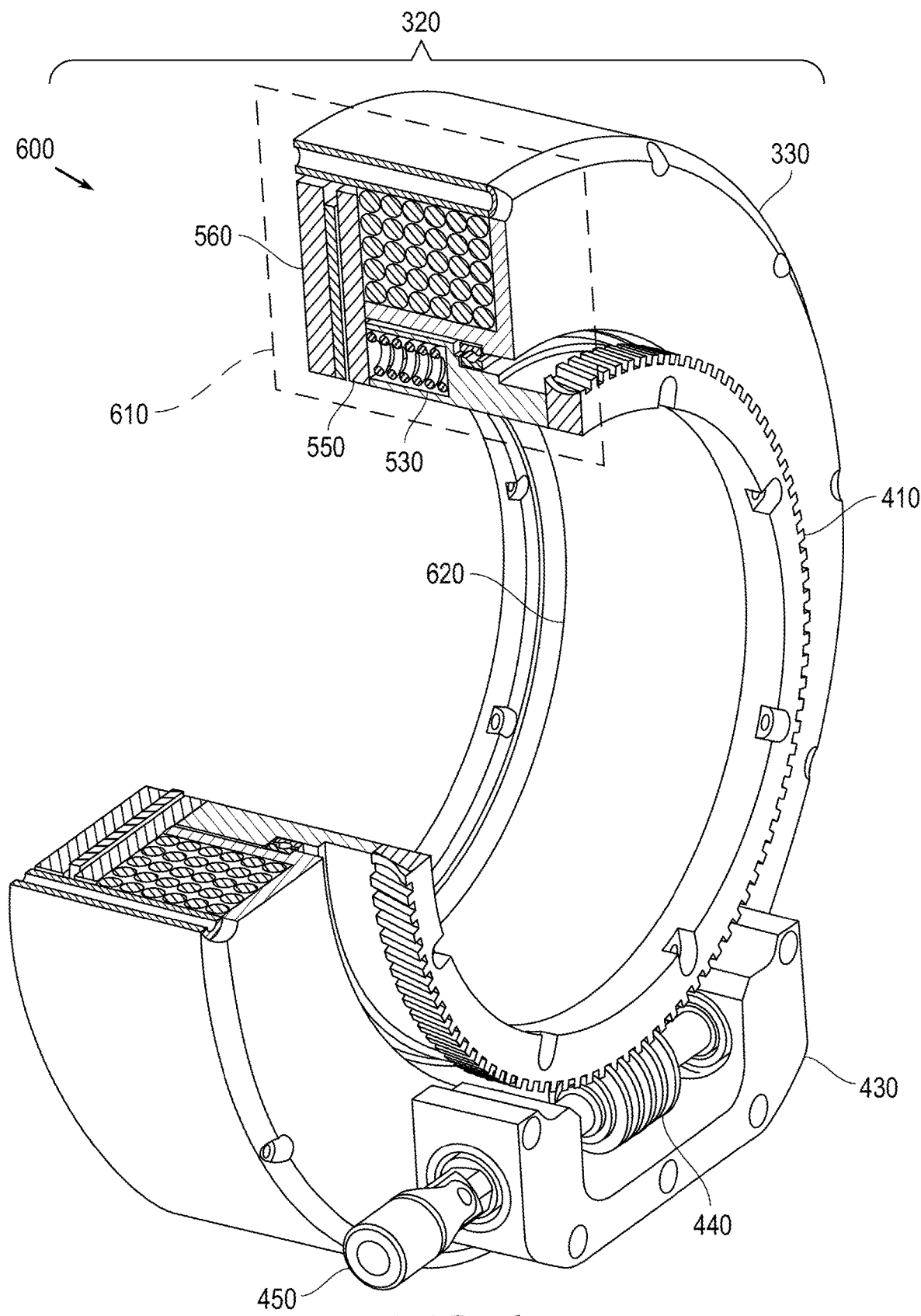
FIG. 6 is an isometric cross-sectional view of the manual drive assembly.

FIG. 6 shows an isometric three-quarter cross-sectional view 600 of the manual drive clutch assembly 320 with oblique cross-section 610 identified by hash outline. The clutch assembly 320 includes the housing 330 that supports a jackshaft sleeve 620 by a set of roller bearings (see FIG. 7). The wormgear 410 attaches to the jackshaft sleeve 620. The worm drive 420 includes the worm housing 430 containing the worm 440 that can be manually turned by the input 450.

The worm housing 430 attaches to the housing 330, which enables the worm 440 to mesh with the wormgear 410. The clutch assembly 320 includes the armature plate 550 and liner carrier 560 at the proximal side of the housing 330. The manual drive assembly 610 can be incorporated at the end of the generic trunnion assembly 140. Note that for manual operation, the trunnion sleeve 240 has also been extended axially in length.

Figure 7:
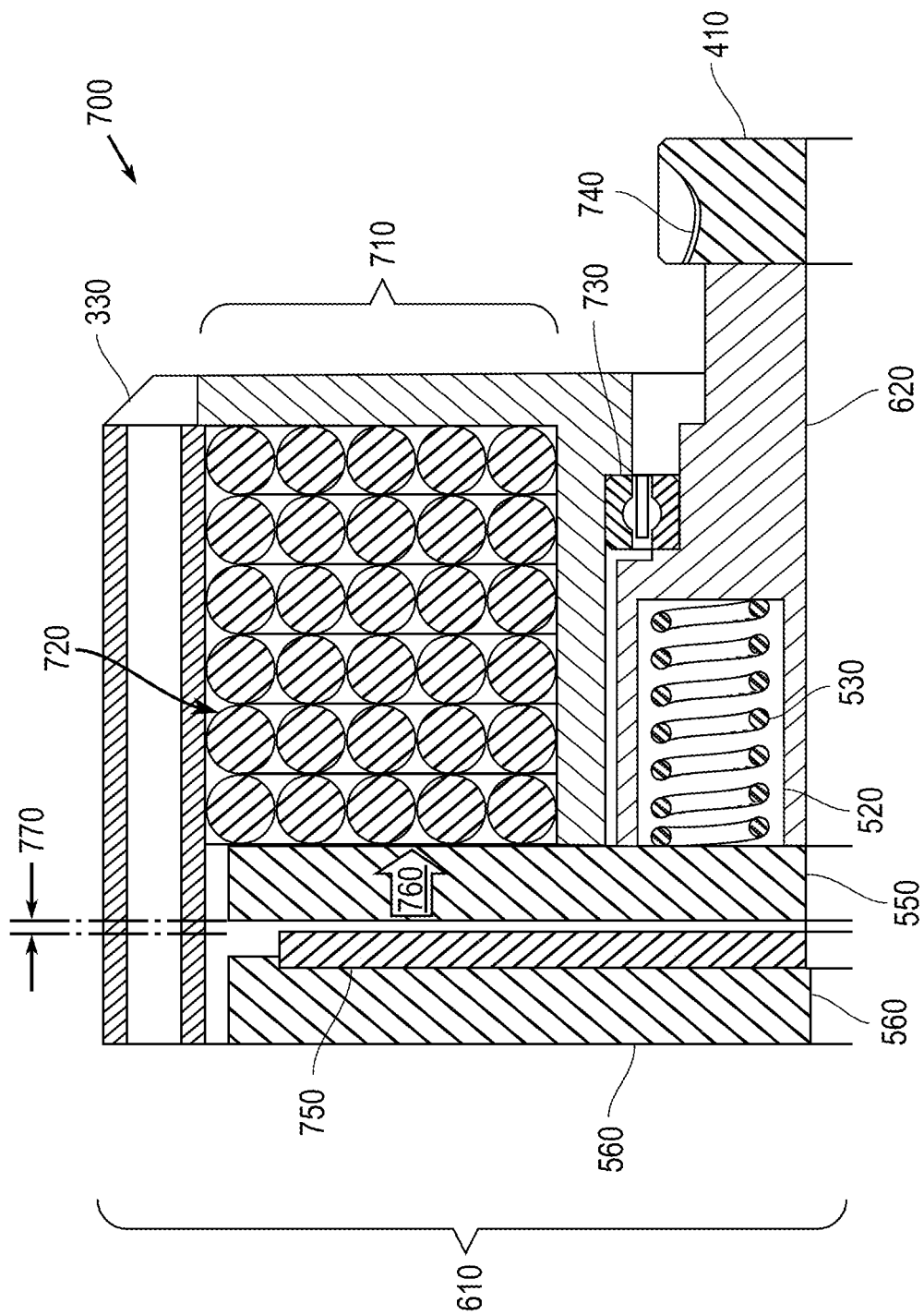
FIG. 7 is a detail elevation cross-sectional view of a clutch assembly in the powered state.

FIG. 7 shows a detail cross-sectional elevation view 700 of the manual drive assembly 610. Potted into the housing 330 within an annular channel along the surface 510 is a coil 710 of copper winding rings 720 that, when energized with an electric current, magnetically attracts and moves the armature plate 550 towards the coil 710, subsequently compressing the annularly disposed set of springs 530 in their respective pockets 520.

A set of roller bearings 730 support the jackshaft sleeve 620 from the housing 330. The wormgear 410 includes concave teeth 740 to engage the spiral of the worm 440. At the front of the clutch assembly 320 is disposed the liner carrier 560, on which attaches a friction liner 750 of abrasive material. The liner carrier 560 is fixed to the end of the trunnion sleeve 240.

Multiple helical springs 530 press the ferrous armature plate 550 into contact with the friction liner 750. Once the coil 710 is activated to produce magnetic force 760 that counteracts the springs 530, the armature plate 550 moves out of contact with the friction liner 750 to form a separation gap 770, and then the trunnion sleeve 240 is permitted to freely rotate. Thus, view 700 shows the gimbal assembly 310 in the powered state.

The jackshaft sleeve 620 defines the annulus 340 around which the pockets 520 are arranged and into which the springs 530 are nested. The set of guide pins 570 mount to the armature plate 550, and fit into alignment recesses 540 in the jackshaft sleeve 620. These guide pins 570 enable the armature plate 550 to translate axially with respect to the jackshaft sleeve 620, but prevent rotation between the armature plate 550 and jackshaft sleeve 620. Splines or keys could also be used.

Figure 8:
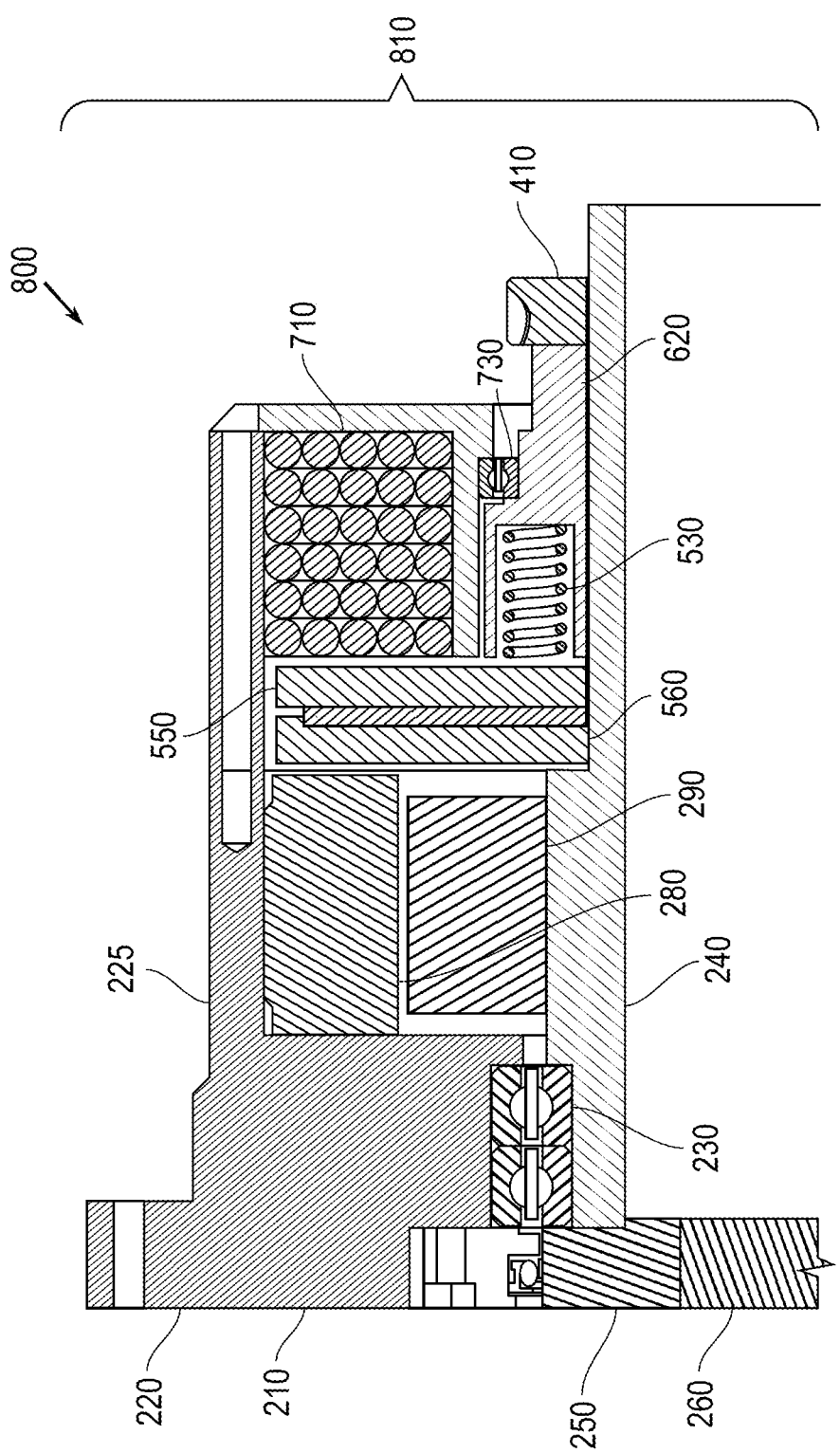
FIG. 8 is an elevation cross-sectional view of completed trunnion assembly, shown in the unpowered state.

FIG. 8 shows a cross-sectional elevation view 800 of the entire exemplary trunnion assembly 810 in the unpowered state. Note that the armature plate 550 is in contact with the friction liner 750 without the gap 770. The friction force from the liner 750 that exists between the armature plate 550 and the liner 750 couples the trunnion sleeve 240 to the jackshaft sleeve 620. In this unpowered state, any moment loads experienced by the payload 150 are transmitted to the jackshaft sleeve 620, and hence to the wormgear 410.

By contrast, in the powered state as shown in view 700, power has been applied to the coil 710, creating electromagnetic force 760 that attracts the armature plate 550, compressing the set of springs 530. This opens the gap 770 between the armature plate 550 and the liner 750, enabling the trunnion sleeve 240 to spin freely.

Operational Sequence: When the gimbal assembly 310 is to be utilized in its normal tracking mode, the control system applies power to the elevation drive system through the motor 270, and also to the coil 710. When power is applied to the coil 710, the armature plate 550 retracts from the liner 750 producing the separation gap 770, enabling the trunnion sleeve 240 to spin freely under the influence of the elevation drive system. Discontinuation of power to the coil 710 dissipates the electromagnetic field, and the springs 530 apply the armature plate 550 to the liner 750 and collapses the gap 770. This couples the trunnion sleeve 240 to the jackshaft sleeve 620, and thereby enables the wormgear 410 to be turned by the input 450.

Because the gear arrangement 420 is non-overrunning, the payload 150 will be held stationary. Also, in the unpowered state, the manual input may be used drive the payload 150. In the event that power is interrupted unexpectedly while the payload 150 is still in motion, the interaction between the armature plate 550 and liner 750 serves as a brake, bringing the payload 150 to a stop. In exemplary embodiments, the coil 710 is powered with 24 $V_{DC}$. Two wires, not shown, exit through a hole in the housing 330 for connecting to a voltage source.

The advantages are as follows:
(1) No parasitic drag is introduced to the motion of the payload 150 or to the elevation drive system with the motor 270 while in normal operation. Such drag would be detrimental to the tracking performance of the servo system.
(2) No operator action is required to shift the gimbal assembly 310 between the powered to the manual states. This is instead accomplished automatically.
(3) The gimbal assembly 310 is arranged in a concentric manner, annularly around the elevation axis of the yoke shaft 160.

Note that the large through-bore for the trunnion sleeve 240 is unobstructed. Cables, hoses, wave guides, and optical Coude paths utilize this passage into the payload 150, so it is critical that this be the case.

Alternatives: Alternative solutions are available to the braking problem. Drum brakes may act directly on the trunnion sleeve 240, or a brake rotor may be attached, on which a brake caliper would act. These can be installed to function automatically, and to preserve the large through-bore, but do not provide for manual drive input.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A trunnion clutch system for angularly positioning a payload, said system comprising:
   a trunnion including an annular trunnion housing, a trunnion shaft that engages the payload, and an electromagnetic motor that turns said trunnion housing; and
   a clutch including an annular clutch housing that contains a channel, a jack shaft disposed in said clutch housing that engages said trunnion, a coil of copper winding rings disposed within said channel, a plurality of helical springs disposed within an angularly distributed plurality of pockets within said clutch housing, an annular armature disposed to be separate from said coil by a gap via said springs, and an annular platform having an abrasive liner disposed adjacent said armature, wherein
   energizing said coil pulls said armature away from said liner, disengaging said trunnion.

2. The system according to claim 1, wherein said clutch further includes a wormgear connected to said jack shaft, and a worm engaged to turn said tooth ring upon energizing said coil.

3. A clutch for coupling and decoupling a trunnion, comprising:
   an annular clutch housing that contains a channel;
   a jack shaft disposed in said housing that engages the trunnion;
   a coil of copper winding rings disposed within said channel;
   a plurality of helical springs disposed within an angularly distributed plurality of pockets within said housing;
   an annular armature disposed to be separate from said coil by a gap via said springs; and
   an annular platform having an abrasive liner disposed adjacent said armature, wherein
   energizing said coil pulls said armature away from said liner, disengaging the trunnion.

4. The clutch for coupling and decoupling a trunnion according to claim 3, further comprising:
   a wormgear connected to said jack shaft; and
   a worm engaged to turn said wormgear upon energizing said coil.

* * * * *